United States Patent
Michael et al.

(10) Patent No.: US 6,826,651 B2
(45) Date of Patent: Nov. 30, 2004

(54) STATE-BASED ALLOCATION AND REPLACEMENT FOR IMPROVED HIT RATIO IN DIRECTORY CACHES

(75) Inventors: Maged M. Michael, Danbury, CT (US); Ashwini Nanda, Mohegan Lake, NY (US); Thomas Basil Smith, III, Wilton, CT (US)

(73) Assignee: International Business Machines Corporation, Armonk, NY (US)

(*) Notice: Subject to any disclaimer, the term of this patent is extended or adjusted under 35 U.S.C. 154(b) by 430 days.

(21) Appl. No.: 09/801,036

(22) Filed: Mar. 7, 2001

(65) Prior Publication Data

US 2001/0010068 A1 Jul. 26, 2001

Related U.S. Application Data

(63) Continuation-in-part of application No. 09/087,094, filed on May 29, 1998.

(51) Int. Cl.[7] ............................................. G06F 12/08
(52) U.S. Cl. ........................ 711/119; 711/133; 711/144; 711/145
(58) Field of Search ................................. 711/119, 120, 711/133, 144–145, 147, 154, 156; 709/213, 216, 232

(56) References Cited

U.S. PATENT DOCUMENTS

| | | | | |
|---|---|---|---|---|
| 5,752,258 A | * | 5/1998 | Guzovskiy et al. | 711/120 |
| 5,860,120 A | * | 1/1999 | Young et al. | 711/156 |
| 5,864,671 A | * | 1/1999 | Hagersten et al. | 709/213 |
| 6,055,610 A | * | 4/2000 | Smith et al. | 711/156 |
| 6,141,692 A | * | 10/2000 | Loewenstein et al. | 709/234 |
| 6,154,811 A | | 11/2000 | Srbljic et al. | 711/118 |
| 6,202,132 B1 | | 3/2001 | Islam et al. | 711/141 |
| 6,243,742 B1 | | 6/2001 | Hagersten et al. | 709/213 |

OTHER PUBLICATIONS

M. M. Michael et al., patent application "System and Method for Improving Directory Lookup Speed," S.N. 09/087,094 filed May 29, 1998.

* cited by examiner

Primary Examiner—Pierre M. Vital
(74) Attorney, Agent, or Firm—F. Chau & Associates, LLC

(57) ABSTRACT

A system and method of maintaining consistent cached copies of memory in a multiprocessor system having a main memory, includes a memory directory having entries mapping the main memory, an access history information in the memory directory entries, and a directory cache having records corresponding to a subset of the memory directory entries. The memory directory may be a full map directory having entries mapping all of the main memory or a sparse directory having entries mapping to a subset of the main memory. The method includes the steps of receiving a signal indicating a processor cache miss, retrieving a memory directory entry from the memory directory, updating the access history of the memory directory entry, selecting a directory cache line based on its access history and allocating the directory cache line for replacement, and writing the memory directory entry into the directory cache.

21 Claims, 7 Drawing Sheets

STATE-BASED ALLOCATION AND REPLACEMENT FOR IMPROVED HIT RATIO IN DIRECTORY CACHES

CROSS-REFERENCE TO RELATED APPLICATION

This application is a continuation-in-part of U.S. patent application Ser. No. 09/087,094, filed May 29, 1998, entitled "SYSTEM AND METHOD FOR IMPROVING DIRECTORY LOOKUP SPEED" ("parent application") which is hereby incorporated by reference.

FIELD OF THE INVENTION

The present invention relates to the efficient processing of memory requests in cache coherent distributed shared memory multiprocessor systems. More specifically, the present invention leads to improved processing speed and reduced size of directory caches in the coherence controller of shared memory multiprocessor systems by utilizing an efficient directory cache replacement policy.

BACKGROUND OF THE INVENTION

Conventional computer systems often include on-chip or off-chip cache memories that are used with processors to speed up accesses to system memory. In a shared memory multiprocessor system, more than one processor, sometimes referred to as a compute node, can store a copy of the same memory locations (or lines) in their respective cache memories. An internode cache coherence mechanism is required to maintain consistency among the multiple cached copies of the same memory line across all nodes that store the line. In small, bus-based multiprocessor systems, the internode cache coherence mechanism is usually implemented as a part of the cache controllers using a snoopy coherence protocol. The snoopy protocol cannot be used in large systems that are connected through a non-broadcast interconnection network since snoopy protocols may require all requests to be broadcast to all nodes. As a result, these systems use a directory-based protocol to maintain cache coherence, where a memory directory in each node is associated with the main memory. The coherence controllers of cache coherent distributed shared memory multiprocessor systems use these memory directories to maintain a record of the state of memory lines in the caches of the various processing nodes of the multiprocessor system. This state information includes data indicating which cache(s) has a copy of a given line or whether the line has been modified in a cache(s).

FIG. 1 illustrates a representation of an example of a shared memory multi-node computing system. On a system area network 100, one or more nodes exist. The system can include one or more compute nodes 110, memory nodes 112, and/or compute/memory nodes 114. Each compute node 110 includes one or more processors with associated caches 120, one or more shared/remote caches 130 (optional), and one or more coherence controllers 160. Caches 120 and 130 can be referred to collectively as "data cache." Each memory node 112 contains one or more main memory modules 140, at least one memory directory 150 which stores information about the contents of its associated main memory 140, at least one coherence controller 160, at least one directory cache (DC) 170, as disclosed in the parent application, and may also include one or more I/O devices (not shown). A compute/memory node 114 includes the elements of a compute node and a memory node.

Memory directories such as 150 may be organized as "full map" memory directories where the state information on every single memory line is stored by mapping each memory line to a unique location in the directory. That is, there is a one to one state mapping between a main memory line and a memory directory entry. As a result, when the size of main memory increases, the memory directory size must also increase. If the memory directory is implemented as relatively fast static RAM, tracking the size of main memory becomes prohibitively expensive. If the memory directory is implemented using slow static RAM or DRAM, higher cost is avoided, but a penalty is incurred in overall system performance due to the slower chips. In fact, each directory access in such slower implementations will take approximately 5–20 controller cycles to complete.

In order to overcome the problems with full map memory directories, "sparse" memory directories have been used instead. In a sparse memory directory multiple memory lines are mapped to a single location in the sparse directory, although state information stored in the mapped location may be valid only for a subset of the memory lines mapping to that location. Due to its smaller size, a sparse directory can be implemented in an economical fashion using fast static RAMs. However, when there is contention among memory lines for the same sparse directory entry field, i.e., when it is desired to store directory information for a given line of memory in a location that already contains current directory information for another line of memory, the state information of the line already stored in the memory directory must be replaced. Since there is no backup state information, when a line is replaced in the sparse directory, all the caches in the overall system having a copy of that line must be asked to invalidate their copies. This incomplete directory information leads to both coherence protocol complexity and performance loss.

Since directory lookup speed and throughput have been shown to have an important impact on the overall performance of distributed shared memory multiprocessor systems, directory caches, as disclosed in the parent application, having records corresponding to a subset of the memory directory entries can be used. Such smaller and faster directory caches associated with the coherence controllers can be used to improve the speed of directory lookup by keeping the copies of a subset of the memory directory entries in faster on-chip or off-chip memory.

FIG. 2 shows a representation of a directory cache ("DC") system 200 which caches the state information for a subset of memory lines 250 of the main memory 220. While, in this representation, the memory directory 210 is illustrated as a full map memory directory, the memory directory could also be implemented as a sparse directory, or other directory scheme. The DC 200 is organized into DC lines 230 and stores state information from only a subset of the directory entries 240.

FIG. 3 shows an organization of a DC, such as DC 200 of FIG. 2. The DC 200 stores s sets 310. Each set consists of w DC lines 320 corresponding to w ways of set associativity. Each DC line 320 contains a validity indicator 330, a tag 340, and e memory directory entries 350 each containing state information 360 for a line of the associated memory, where w and e are integers greater than or equal to 1 and s is typically a power of 2. The validity indicator 330, which can be a single bit or multiple bits, indicates that the DC line currently holds valid information. The tag 340 maps the directory entries 350 in the cache line back to their locations in memory directory 210.

Improved performance for the DC, and accordingly for the entire multiprocessor system, can be achieved if the subset of memory directory entries cached in the DC consists of the most frequently used entries; that is when the hit ratio of the DC is high. The hit ratio of a cache is mainly dependent on the allocation and replacement policies of such a cache.

In conventional caches, one widely used allocation policy caches each and every memory line (or each memory directory entry or set of entries in the case of directory caches) that is referenced and misses in the cache. A less common policy is to designate parts of memory (or the memory directory in the case of directory caches) as uncacheable, so that uncacheable lines do not compete for limited cache space (a.k.a. cache pollution) with cacheable lines that are more likely to benefit from caching, as judged by the programmer. The problem with this latter policy, if applied to directory caches, is that it requires operating system support and programmer annotations, which are undesirable as they require significant extra programmer effort and, at times, may be impossible to implement.

Two common cache replacement policies are Least Recently Used (LRU) and random replacement. LRU is based on the heuristic that memory lines (or memory directory entries in the case of directory caches) that have not been used recently are less likely to be accessed in the near future than others. The random policy, as implied by its name, replaces entries randomly in cases of conflict.

In distributed shared memory multiprocessor systems, only a small part of what is designated by the operating system as shared memory is actually shared between multiple nodes. Most lines designated as shared memory lines are actually accessed by only one processor on its local node. Using conventional allocation and replacement policies typically results in the pollution of directory caches with directory entries of cache lines that are not in fact shared and that typically remain cached in the conventional caches of local compute nodes after their initial access without causing further accesses to the coherence controller. Conventional caching policies fail in this regard, and therefore methods that adequately address this issue for directory caches are needed.

SUMMARY OF THE INVENTION

It is an object of the invention to provide a cache system that minimizes directory cache pollution, leading to higher directory cache hit ratios and resulting improvement in system performance.

It is another object of the invention to reduce directory cache pollution by providing a directory cache allocation method that utilizes memory line state information.

It is another object of the invention to reduce directory cache pollution by providing a directory cache eviction method that utilizes memory line state information.

It is another object of the invention to improve the quality of memory line state information by including a memory line's sharing history information.

It is another object of the invention to identify lines of shared main memory that are not in fact shared by other nodes in a system and not allocate the directory entries corresponding to such lines in the directory cache, and to evict DC entries representing lines of shared main memory that are never or seldom accessed by more than one node, in order to minimize DC pollution and thereby increase hit ratio, improve the performance of the coherence controllers and, consequently, the overall system performance.

In accordance with one aspect of the invention, the foregoing objectives are realized by providing a system for maintaining consistent cached copies of memory in a multi-node computing system having a main memory, comprising at least one memory directory having memory directory entries mapping the main memory, one or more of the memory directory entries including state information for a corresponding line of main memory, at least one directory cache for storing directory cache lines corresponding to a subset of the memory directory entries, and means for using the state information to allocate memory directory entries to the directory cache.

A second aspect of the invention provides a system for maintaining consistent cached copies of memory in a multi-node computing system having a main memory, comprising at least one memory directory having memory directory entries mapping the main memory, one or more of the memory directory entries including state information for a corresponding line of main memory, at least one directory cache for storing directory cache lines corresponding to a subset of the memory directory entries, and means for using the state information to evict directory cache lines in the directory cache.

A third aspect of the invention provides an apparatus for maintaining consistent cached copies of memory lines in a multi-node computing system having a main memory, comprising at least one memory directory having memory directory entries mapping the main memory, and memory directory entries, stored in the memory directory, including state information indicating whether one or more nodes in the multi-node computing system have an associated data cache that contains a copy of a memory line corresponding to the memory directory entry.

A fourth aspect of the invention provides a method of maintaining state information in a memory directory entry of a multi-node computing system having a main memory, one or more nodes in the system having a coherence controller, a processor cache, a memory directory of the main memory and a directory cache of the memory directory, the method comprising the steps of receiving a signal at the directory cache in one node of the system indicative of a coherence request for a cached memory line from one of the other nodes of the system, performing a memory directory lookup to determine the location of the directory entry of the cached memory line, and storing information describing sharing behavior of the cached memory line.

A fifth aspect of the invention provides a method of directory cache eviction in a multi-node computing system having a main memory, one or more of the nodes having a coherence controller, a processor cache, a memory directory associated with the main memory, and a directory cache of the memory directory having directory entries storing state information for associated lines of main memory, the method comprising the step of selecting a directory cache line for eviction based on the state information of the retrieved directory cache line, and updating a validity indicator associated with the selected cache line to indicate that the directory cache line does not include valid information.

A sixth aspect of the invention provides a method of directory cache allocation in a multi-node computing system having a main memory, one or more of the nodes in the system having a coherence controller associated with the main memory, memory directory associated with the main memory, a directory cache of the memory directory having directory entries storing state information for associated lines of main memory, the method comprising the steps of retrieving a memory directory entry from a memory directory, and deciding whether to allocate the memory directory entry based on the state information of the memory directory entry.

BRIEF DESCRIPTION OF THE DRAWING

These and other features of the present invention will become apparent from the accompanying detailed description and drawings, wherein.

DETAILED DESCRIPTION

Figure 1:
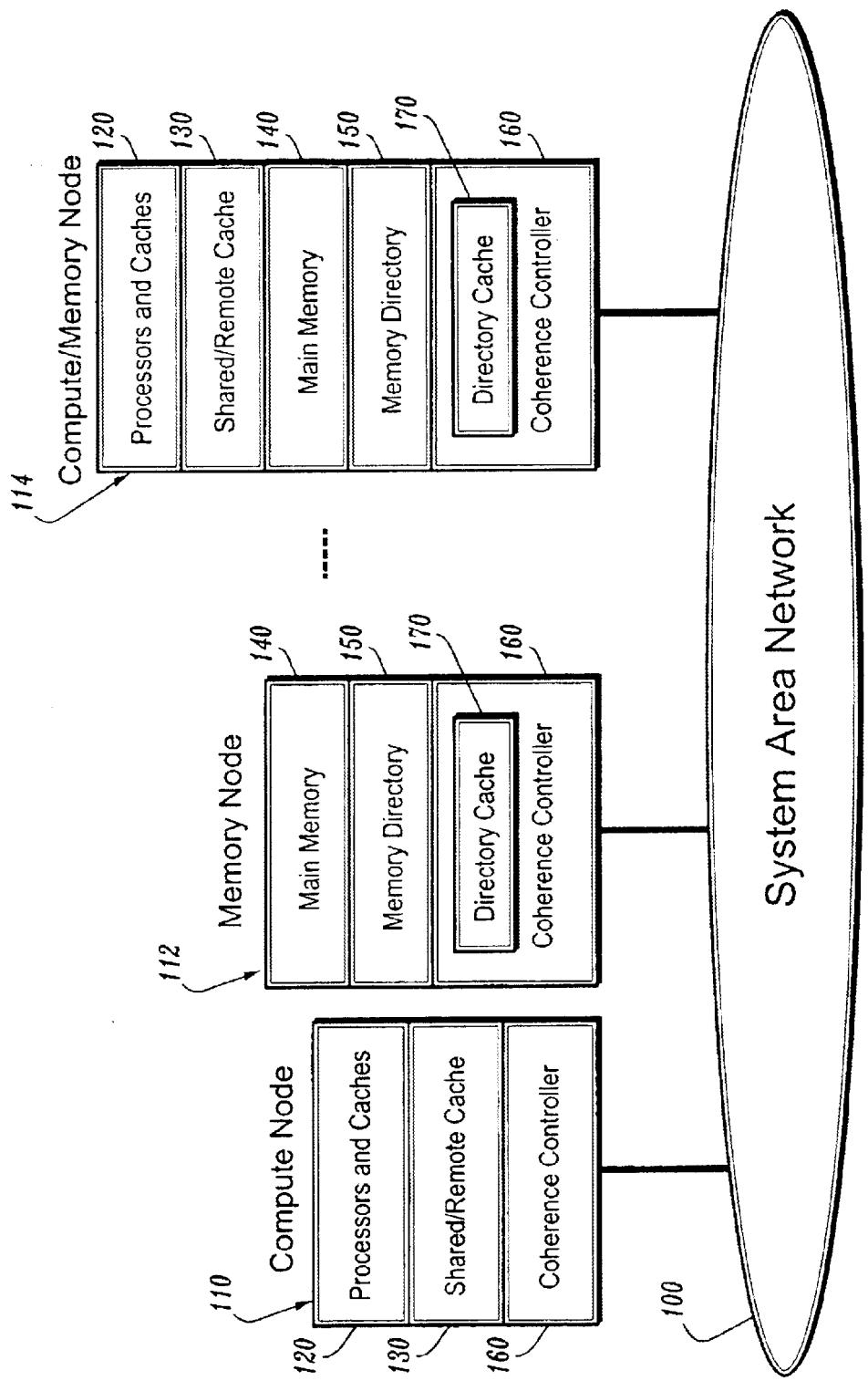
FIG. 1 shows an example of a system environment which can incorporate the present invention.
Figure 2:
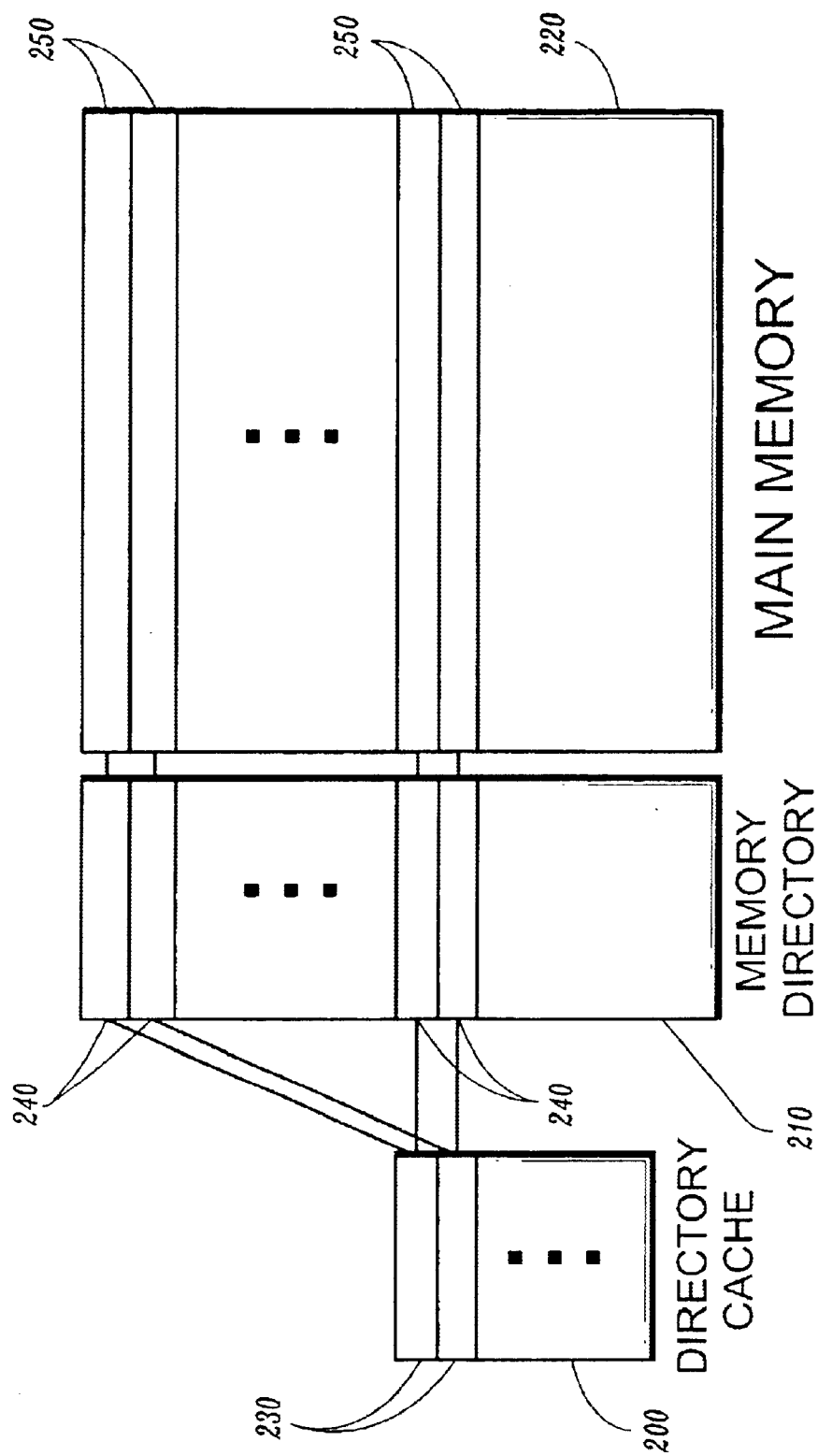
FIG. 2 shows the relationship among a directory cache, a memory directory and main memory in a system that can operate in accordance with the invention.
Figure 3:
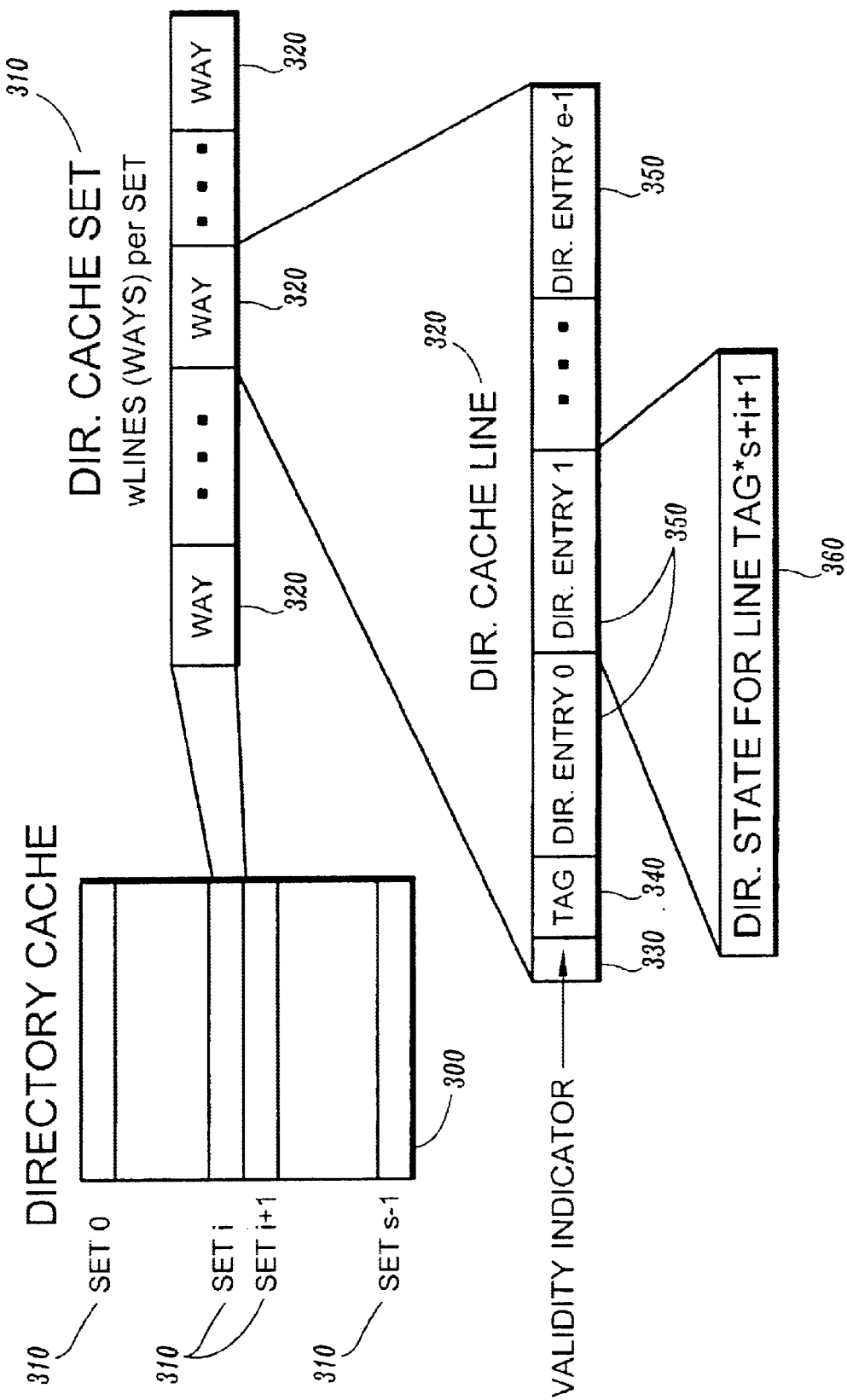
FIG. 3 shows an implementation of a directory cache that can operate in accordance with the invention.
Figure 4:
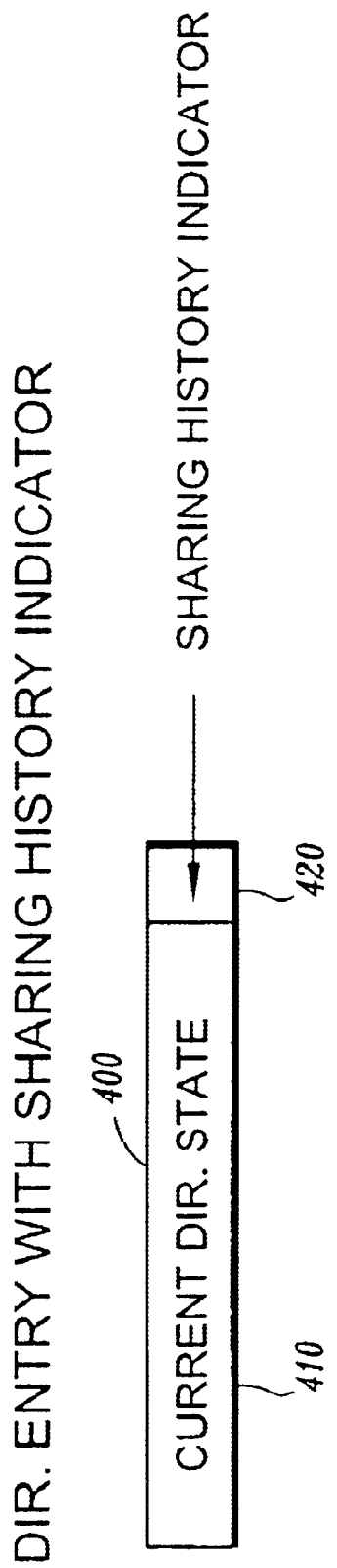
FIG. 4 shows a memory directory state information entry that includes a sharing history indicator according to an embodiment of the present invention.

FIG. 4 depicts an embodiment of a sharing history indicator incorporated into the state information of a memory directory entry in accordance with the present invention. A memory directory entry 400 of a memory directory such as 150 in FIG. 1 comprises current directory state information 410 (as is found in conventional memory directory entries) as well as a novel sharing history indicator 420. The sharing history indicator 420 can have a value representing "private" or "shared," where private indicates that only the node at which the memory line is stored currently maintains a cached copy of the line, and shared indicates that at least one other node has cached a copy of the line. The sharing history indicator may occupy one or more bits, but the following discussion of FIG. 5 will assume implementation of the single bit embodiment. In an embodiment where it occupies a single bit, "1" can indicate shared, while "0" can indicate private.

Figure 5:
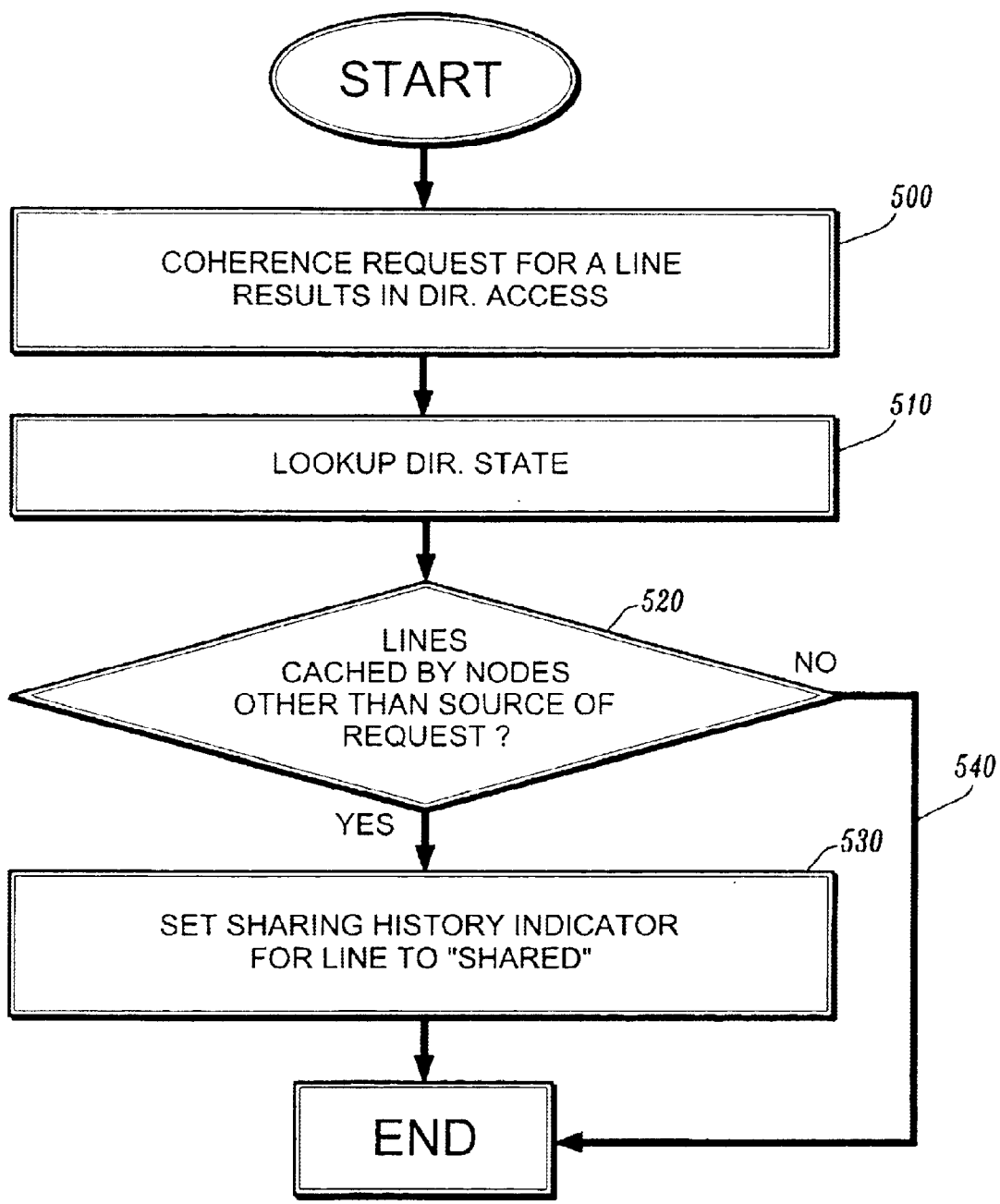
FIG. 5 shows a process of updating the sharing history indicator portion of the state information entry according to an embodiment of the present invention.

FIG. 5 is a flow diagram describing the operation of an embodiment of a method for managing the setting of a sharing history indicator in accordance with the present invention. The sharing history indicator 420 begins with an initial value of "private." When a coherence request (i.e., a request for access) for a memory line 250 is made, it will result in a memory directory access, and a signal indicative of the access is presented to the DC 200 in step 500. The DC 200 then invokes a directory state lookup for the memory line 250, in step 510. This lookup can be satisfied either in the DC 200, in the case of a DC hit, or in the memory directory 210 in the case of a DC miss. In either case, if, in step 520, the line of main memory 250 to which the directory entry 240 corresponds is determined to be cached by a node 110 or 114 other than the source of the coherence request, as indicated by the state information stored in the memory directory for the memory line 250 (or possibly also in the DC, if the memory directory entry is cached) the sharing history indicator 420 for that line is set to "shared" in step 530. Otherwise the sharing history indicator is not changed.

Thus, the system of the present invention may maintain access history information in each memory directory entry along with the conventional current state information. The access history information can range in size from a single sharing history indicator bit that indicates whether a cache line has a shared or private access pattern that is updated based on access events to the corresponding directory entry (as described above), to multiple multi-bit fields of access history such as the identities of the last node to access the line, the last reader, the last writer, a shared/private bit, indicators of the types of access patterns such as producer-consumer, or migratory, etc. The single sharing history indicator bit approach is advantageous because of its efficient use of directory space.

Figure 6:
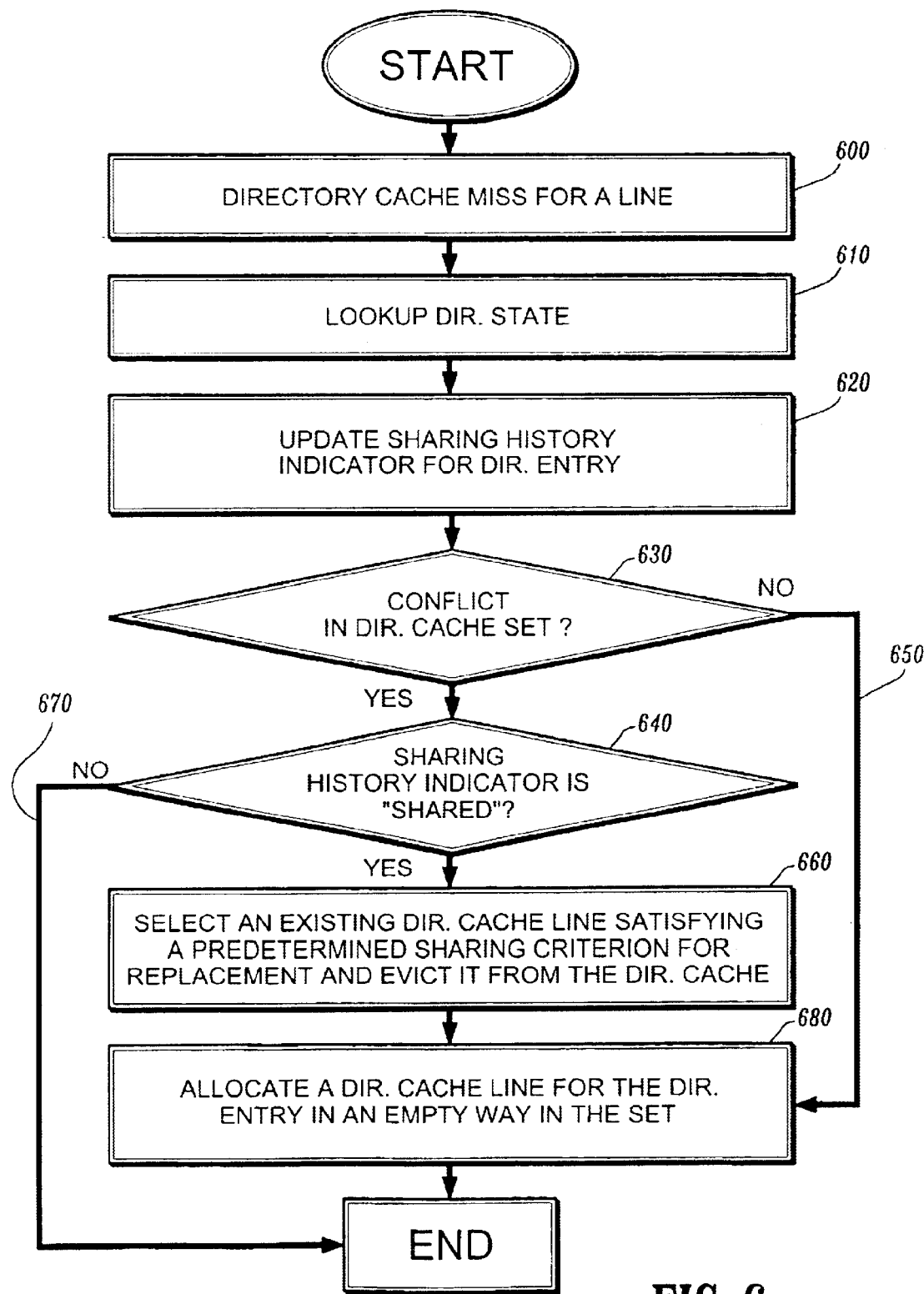
FIG. 6 shows the operation of one embodiment of the allocation and replacement method of the present invention using the sharing history indicator portion of the state information entry.

FIG. 6 illustrates the operation of a DC allocation and replacement method according to an embodiment of the present invention. When a DC miss occurs in the DC 200 in step 600, a directory state lookup request is presented to the memory directory 210 and the directory entry 240 (i.e., state information 360) is returned to the DC 200 in step 610. In step 620, the DC 200 updates the sharing history indicator of the directory entry as appropriate according to steps 520–530 of FIG. 5. In step 630, a determination is made as to whether there is a conflict in the DC set 310 where the retrieved directory entry 240 is to be allocated, i.e., whether all lines 320 in the set 310 have their validity indicators 330 set to "valid" (typically coded 1). If so, the sharing history indicator of the retrieved directory entry 240 is examined, in step 640. Otherwise, if there is no conflict, the retrieved directory entry (optionally with other adjacent directory entries) is stored in an empty DC line 320 in step 680. If the sharing history indicator 420 of the retrieved directory entry 240 examined in step 640 is found to be set to "shared," all the DC lines 320 in the DC set 310 are examined, in step 660, and the line meeting a predetermined sharing behavior criterion is selected and evicted (i.e., designated for replacement by changing the line validity indicator 330 to "invalid, or "0") from the DC 200, thus creating an empty DC line 320 in the set 310. One possible criterion could be the smallest number of directory entries 400 with sharing history indicators 420 set to "shared," but it will be appreciated that other criteria for eviction may be set in accordance with system needs. Finally, the retrieved directory entry 240 (optionally with other adjacent entries) is allocated in the place of the evicted DC line 320, in step 680. If the sharing history indicator 420 of the retrieved directory entry 350 examined in step 640 is determined to be set to "private" (i.e. not "shared"), the directory entry is not cached in the DC (i.e. no allocation or replacement is performed in the set 310).

Thus, in accordance with one embodiment of the invention, an allocation policy is to allocate only directory entries with sharing history indicators set to "shared," in the case of conflict in the corresponding DC set. By avoiding the allocation of a private entry, the replacement of a shared entry is avoided. Since a shared entry is more likely to be accessed in the future than a private entry, a better hit ratio can be achieved by using this allocation policy. A preferable replacement policy when the allocated entry is shared is to select the DC entry with the least number of shared directory entries for replacement.

The allocation and eviction policies described above need not be used together in a system in order to take advantage of the invention. That is, the disclosed allocation policy can be used in combination with any eviction policy now known or hereafter developed, and the disclosed eviction policy can be used in combination with any allocation policy now known or hereafter developed.

Figure 7:
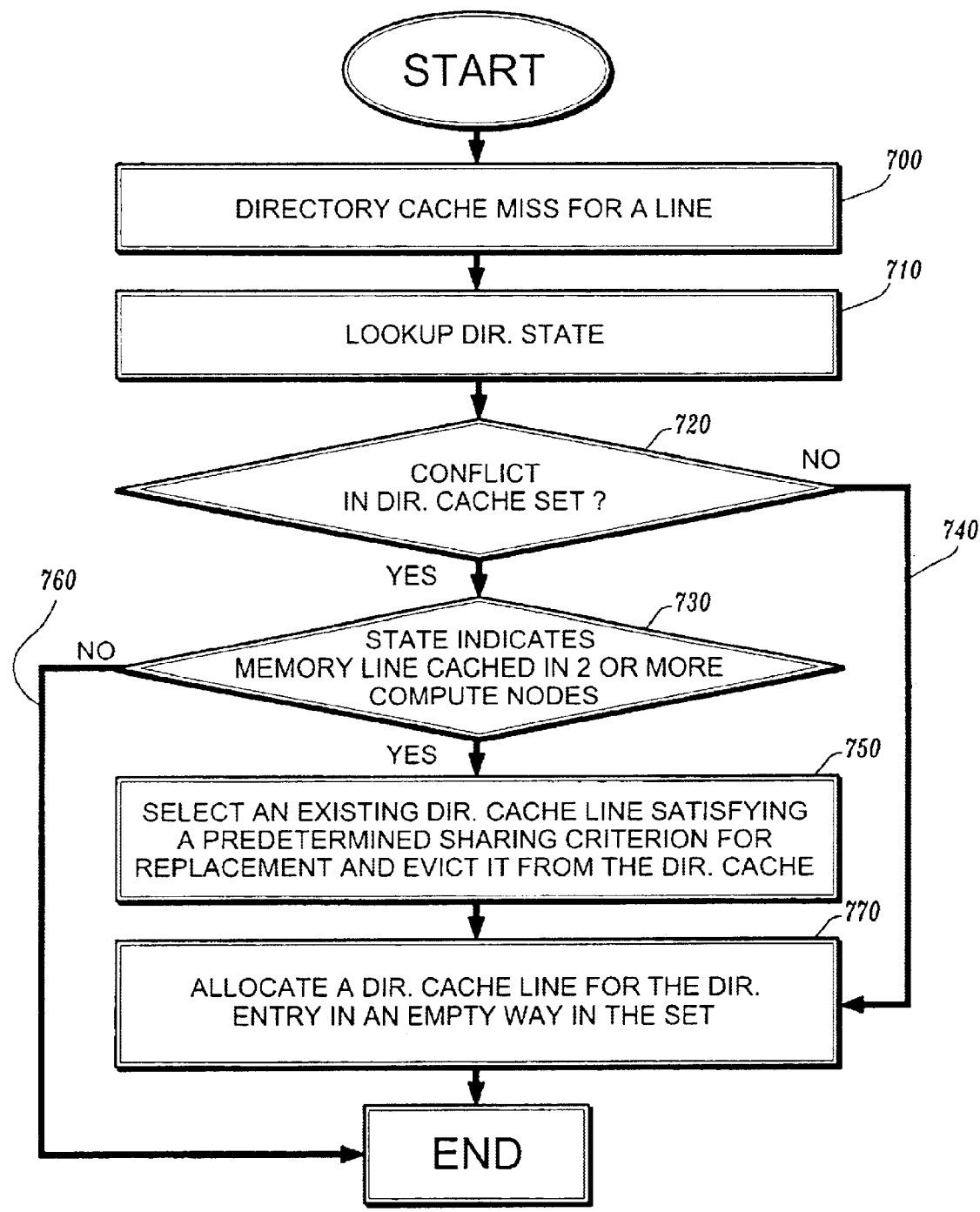
FIG. 7 shows the operation of one embodiment of the allocation and replacement method of the present invention using the portion of the state information entry other than the sharing history indicator.

Another embodiment of the present invention that achieves the desired performance improvement, but without requiring access to sharing history information, relying solely on a method for deducing sharing patterns from conventional directory state information, is depicted in FIG. 7, which illustrates the operation of a DC allocation and replacement method according to such an embodiment of the present invention. When a DC miss occurs in the DC 200 in step 700, a directory state lookup request is presented to the memory directory 210 and the directory entry 240 value (state information 360) is returned to the DC 200 in step 710. In step 720, a determination is made as to whether there is a conflict in the DC set 310 where the retrieved directory entry 240 is to be allocated, which would be the case if all lines 320 in the set 310 have their valid bits 330 set to "valid". If so, the state information 360 of the retrieved directory entry 240 is examined, in step 730. Otherwise, if there is no conflict 740, the retrieved directory entry (optionally with other adjacent directory entries) is stored in an empty DC line 320 in step 770. If the state information 360 of the retrieved directory entry 240 examined in step 730 is found to indicate that the corresponding memory line is, or is in the process of being, cached in two or more compute nodes, all the DC lines 320 in the DC set 310 are examined, in step 750, and the line satisfying a predetermined sharing criterion is selected and evicted (i.e. replaced) from the DC 200, thus creating an empty DC line 320 in the set 310. Note that one possible criterion could be that a line has the least directory entries 350 with state information 360 indicating that the corresponding memory lines are individually cached by two or more compute nodes, but it will be appreciated that other criteria for eviction may be set in accordance with system needs. Finally, the retrieved directory entry (optionally with other adjacent entries) is allocated in its place, in step 770. If the sate information 360 of the retrieved directory entry 240 examined in step 730 indicated 760 that the corresponding memory line is not, and is not in the process of being, cached by two or more compute nodes, the directory entry is not cached in the DC (i.e. no allocation or replacement is performed in the set 310).

In a preferred embodiment of such approach, an allocation method of a directory entry is to cache it in the directory cache in the case of conflict, where all ways are occupied, only if the corresponding memory line is, or is in the process of being, cached in two or more compute nodes concurrently, as indicated by the contents of the directory entry, with the expectation that such a directory entry is likely to be accessed frequently. An eviction (replacement) method, in the case of conflict where a directory cache line, having a plurality of directory entries, needs to be selected for eviction, is to select the directory cache line with the least directory entries corresponding to memory lines cached in two or more compute nodes, with the expectation that such directory entries are likely to be less frequently accessed than others in other directory cache lines in the same directory cache set.

These methods can eliminate a large percentage of cases of DC pollution. However, since directory state information indicates the caching status of a cache line at a specific moment, but not its history of access, allocation and replacement methods can benefit from access history information described previously in yielding even better DC hit ratios.

As with the allocation and eviction policies described earlier, the foregoing allocation and eviction policies described above need not be used together in a system in order to take advantage of the invention.

Improving the hit ratio of directory caches as provided by the present invention can result in significant improvements in the overall performance of cache coherent shared memory multiprocessor servers. Also, it can allow system designers to maintain the same performance of systems without the present invention by applying the method of the present invention to systems with smaller directory caches thus saving DC space and costs.

Now that the invention has been described by way of the foregoing preferred embodiments, various modifications and improvements will occur to those of skill in the art. For instance, an allocation and replacement method of the present invention can be designed using extensive access history information such as the identity of the last compute node to access the corresponding memory line for reading, writing, or both, or the largest number of sharers for a line, for an allocation and replacement method. Thus, it should be understood that the preferred embodiments are provided as examples and not as a limitation. The scope of the invention is defined by the appended claims.

We claim:

1. A system for maintaining consistent cached copies of memory in a multi-node computing system having a main memory comprising:

at least one memory directory having memory directory entries mapping the main memory, one or more of the memory directory entries including state information for a corresponding line of main memory;

at least one directory cache for storing directory cache lines corresponding to a subset of the memory directory entries, said at least one directory cache disposed within the functionality of a corresponding coherence controller;

means for using the state information to allocate memory directory entries to the directory cache; and at least one single-bit sharing history indicator corresponding to each of at least one memory directory, said at least one single-bit sharing history indicator indicating a first value or a second value, wherein the first value indicates that only one node maintains a cached copy of the corresponding line of main memory and the second value indicates that more than one node maintains a cached copy of the corresponding line of main memory.

2. The system of claim 1, wherein the means for using the state information comprises determining sharing behavior of a memory line corresponding to the state information.

3. The system of claim 1, wherein the state information includes at least one bit in each of the memory directory entries, said at least one bit indicating sharing behavior of its corresponding memory lines.

4. The system of claim 1, wherein the state information in a memory directory entry includes data indicating which one of the more nodes in the multi-node computing system have an associated data cache that contain a cop of a memory line corresponding to such memory directory entry.

5. The system of claim 1, wherein the subset of the memory directory entries corresponds to a set of most frequently used memory directory entries.

6. A system for maintaining consistent cached copies of memory in a multi-node computing system having a main memory, comprising:

at least one memory directory having memory directory entries mapping the main memory, one or more of the memory directory entries including state information for a corresponding line of main memory;

at least one directory cache for storing directory cache lines corresponding to a subset of the memory directory entries; and means for using the state information to select the directory cache line with the least memory directory entries for the corresponding line of main memory cached in two or more nodes and evict the directory cache lines in the directory cache.

7. The system of claim 6, wherein the means for using the state information comprises determining sharing behavior of a memory line corresponding to the state information.

8. The system of claim 6, wherein the state information includes at least one bit in each of the memory directory entries, said at least one bit indicating sharing behavior of its corresponding memory lines.

9. The system of claim 6, wherein the state information in a memory directory entry includes data indicating which one or more nodes in the multi-node computing system have an associated data cache that contains a copy of a memory line corresponding to such memory directory entry.

10. The system of claim 6, wherein the state information in a memory directory entry includes a single-bit indicator that indicates whether or not a memory directory entry has been accessed by another node in the multi-node computing system.

11. The system of claim 6, wherein the multi-node computing system further includes a plurality of coherence controller subsystems and wherein each of the at least one directory cache is associated with one or more of the plurality of coherence controller subsystems.

12. The system of claim 6, wherein the subset of the memory directory entries corresponds to a set of most frequently used memory directory entries.

13. Apparatus for maintaining consistent cached copies of memory lines in a multi-node computing system having a main memory comprising:

at least one memory directory having memory directory entries mapping the main memory;

memory directory entries, stored in the memory directory, including state information indicating whether one or more nodes in the multi-node computing system have an associated data cache that contains a copy of a memory line corresponding to the memory directory entry;

at least one coherence controller, each of the at least one directory cache being associated with one or more of the coherence controllers;

at least one directory cache for storing directory cache lines corresponding to a subset of the memory directory entries, said at least one directory cache disposed within the functionality of the corresponding at least one coherence controller;

means for using the state information to allocate directory cache lines to the directory cache.

14. The apparatus of claim 13, wherein the means for using the state information comprises determining sharing behavior of a memory line associated with the state information.

15. The system of claim 13 wherein the state information further includes at least one bit in each of the memory directory entries, said at least one bit indicating sharing behavior of a corresponding memory line.

16. A method of maintaining states information in a memory directory entry of a multi-node computing system having a main memory, one or more nodes in the system having a coherence controller, a processor cache, a memory directory of the main memory and a directory cache of the memory directory, the method comprising the steps of:

receiving a signal at the directory cache in one node of the system indicative of a coherence request for a cached memory line from one of the other nodes of the system;

performing a memory directory lookup to determine the location of the directory entry of the cached memory line; and storing information describing shared behavior of the cached memory line in a single-bit sharing history indicator.

17. A program storage device, readable by machine, tangibly embodying a program of instructions executable by the machine to perform the method steps of claim 16.

18. A method of directory cache eviction in a multi-node computing system having a main memory, one or more of the nodes having a coherence controller, a processor cache, a memory directory associated with the main memory, and a directory cache of the memory directory having directory entries storing state information for associated lines of main memory, the method comprising the step of:

selecting a directory cache line for eviction based on the state information of the retrieved directory cache line;

updating a validity indicator associated with the selected cache line to indicate that the directory cache line does not include valid information;

wherein the selecting step comprises the steps of:

examining the state information for one or more directory entries in a plurality of directory cache lines and determining sharing behavior of corresponding memory lines; and selecting for eviction a directory cache line with the least memory directory entries for the associated line of main memory cached in two or more nodes.

19. A program storage device, readable by machine, tangibly embodying a program of instructions executable by the machine to perform the method steps of claim 18.

20. A method of directory cache allocation in a multi-node computing system having a main memory, one or more of the nodes having a coherence controller, a processor cache, a memory directory associated with the main memory, and a directory cache of the memory directory having directory entries storing state information for associated lines of main memory, the method comprising the steps of:

retrieving a memory directory entry from a memory directory;

deciding whether to allocate the memory directory entry based on the state information of the memory directory entry;

wherein the decision to allocate is based on sharing behavior information contained in a single-bit sharing history indicator in the memory directory entry.

21. A program storage device, readable by machine, tangibly embodying a program of instructions executable by the machine to perform the method steps of claim 20.

* * * * *